(12) United States Patent
Temple et al.

(10) Patent No.: US 12,443,272 B2
(45) Date of Patent: Oct. 14, 2025

(54) PROACTIVE ACTIONS BASED ON AUDIO AND BODY MOVEMENT

(71) Applicant: Apple Inc., Cupertino, CA (US)

(72) Inventors: Brian W. Temple, Santa Clara, CA (US); Devin W. Chalmers, Oakland, CA (US); Thomas G. Salter, Foster City, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 17/689,460

(22) Filed: Mar. 8, 2022

(65) Prior Publication Data
US 2022/0291743 A1 Sep. 15, 2022

Related U.S. Application Data

(60) Provisional application No. 63/159,503, filed on Mar. 11, 2021.

(51) Int. Cl.
| | |
|---|---|
| *G06F 3/01* | (2006.01) |
| *G06F 3/0481* | (2022.01) |
| *G06F 3/16* | (2006.01) |
| *G06V 40/16* | (2022.01) |
| *G06V 40/20* | (2022.01) |

(Continued)

(52) U.S. Cl.
CPC .............. *G06F 3/012* (2013.01); *G06F 3/013* (2013.01); *G06F 3/0481* (2013.01); *G06F 3/16* (2013.01); *G06V 40/174* (2022.01); *G06V 40/20* (2022.01); *G10L 25/51* (2013.01); *G10L 25/78* (2013.01); *G10H 2210/076* (2013.01)

(58) Field of Classification Search
None
See application file for complete search history.

(56) References Cited

U.S. PATENT DOCUMENTS

| | | | | |
|---|---|---|---|---|
| 7,674,967 B2* | 3/2010 | Makino | .................... | G10H 1/40 84/612 |
| 7,806,759 B2* | 10/2010 | McHale | ................ | A63F 13/814 84/610 |
| 9,202,520 B1* | 12/2015 | Tang | .................... | G10H 1/0008 |

(Continued)

FOREIGN PATENT DOCUMENTS

CN 107111642 A 8/2017

*Primary Examiner* — Maria S Ayad
(74) *Attorney, Agent, or Firm* — Thompson Hine LLP (57) ABSTRACT

Various implementations disclosed herein include devices, systems, and methods that determine that a user is interested in audio content by determining that a movement (e.g., a user's head bob) has a time-based relationship with detected audio content (e.g., the beat of music playing in the background). Some implementations involve obtaining first sensor data and second sensor data corresponding to a physical environment, the first sensor data corresponding to audio in the physical environment and the second sensor data corresponding to a body movement in the physical environment. A time-based relationship between one or more elements of the audio and one or more aspects of the body movement is identified based on the first sensor data and the second sensor data. An interest in content of the audio is identified based on identifying the time-based relationship. Various actions may be performed proactively based on identifying the interest in the content.

18 Claims, 4 Drawing Sheets

(51) Int. Cl.
*G10L 25/51* (2013.01)
*G10L 25/78* (2013.01)

(56) References Cited

U.S. PATENT DOCUMENTS

| | | | |
|---|---|---|---|
| 9,286,287 B1* | 3/2016 | Tierney | G06F 40/242 |
| 10,346,472 B2* | 7/2019 | Alexandersson | G06F 3/04842 |
| 10,368,333 B2* | 7/2019 | Aggarwal | H04W 4/12 |
| 10,482,124 B2 | 11/2019 | Chong et al. | |
| 10,846,517 B1* | 11/2020 | Bulusu | G06V 40/161 |
| 10,860,645 B2* | 12/2020 | Oh | G06F 16/637 |
| 10,897,647 B1* | 1/2021 | Hunter Crawley | H04N 21/8547 |
| 11,019,300 B1* | 5/2021 | Baxendale | H04N 21/47815 |
| 11,064,266 B2* | 7/2021 | Trollope | G06Q 10/06 |
| 11,561,621 B2* | 1/2023 | Tang | G06F 3/017 |
| 2012/0124604 A1* | 5/2012 | Small | H04N 21/4223 725/12 |
| 2014/0026156 A1 | 1/2014 | Deephanphongs | |
| 2019/0042647 A1* | 2/2019 | Oh | G06F 16/636 |
| 2019/0246936 A1 | 8/2019 | Garten et al. | |
| 2020/0064458 A1* | 2/2020 | Giusti | G01S 13/426 |
| 2020/0103967 A1 | 4/2020 | Bar-Zeev | |
| 2020/0296521 A1* | 9/2020 | Wexler | G06V 40/165 |
| 2021/0142792 A1* | 5/2021 | Wantland | G06F 3/0481 |
| 2022/0093101 A1* | 3/2022 | Krishnan | G10L 15/063 |
| 2022/0291743 A1* | 9/2022 | Temple | G06V 20/20 |

* cited by examiner

PROACTIVE ACTIONS BASED ON AUDIO AND BODY MOVEMENT

CROSS-REFERENCE TO RELATED APPLICATIONS

This application claims the benefit of U.S. Provisional Application Ser. No. 63/159,503 filed Mar. 11, 2021, which is incorporated herein in its entirety.

TECHNICAL FIELD

The present disclosure generally relates to electronic devices that use sensors to obtain information to understand physical environments and provide audio and/or visual content.

BACKGROUND

Many electronic devices include microphones that capture audio from the physical environments around the devices. Such audio information may be analyzed to identify songs and other sounds in the environments around the devices and to provide information about such sounds.

SUMMARY

Various implementations disclosed herein include devices, systems, and methods that determine that a user is interested in audio content by determining that a movement (e.g., a user's head bob) has a time-based relationship with detected audio content (e.g., the beat of music playing in the background). Some implementations involve a method performed by a device having a processor executing instructions stored on a non-transitory computer-readable medium. The method involves obtaining first sensor data and second sensor data corresponding to a physical environment, the first sensor data corresponding to audio in the physical environment and the second sensor data corresponding to a body movement in the physical environment. The method identifies a time-based relationship between one or more elements of the audio and one or more aspects of the body movement based on the first sensor data and the second sensor data. For example, this may involve determining that a user of the device is bobbing his head to the beat of the music that is playing aloud in the physical environment. Such head bobbing may be recognized as a passive indication of interest in the music. In another example, user motion is recognized as an indication of interest based on its type (e.g., corresponding to excited behavior) and/or the movement following shortly after the time at which a significant event, e.g., a touchdown, occurs in the audio. The method identifies an interest in content of the audio based on identifying the time-based relationship. For example, this may involve determining that a particular song is playing and that the user is interested in the song based on his or her movement matching the beat of the song.

Various actions may be performed proactively based on identifying interest in the content. As examples, the device may present an identification of the content (e.g., displaying the name of the song, artist, etc.), present text corresponding to words in the content (e.g., lyrics), and/or present a selectable option for replaying the content, continuing to experience the content after leaving the physical environment, purchasing the content, downloading the content, and/or adding the content to a playlist. In another example, a characteristic of the content (e.g., music type, tempo range, type(s) of instruments, emotional mood, category, etc.) is identified and used to identify additional content for the user.

Device resources may be used efficiently in determining that a user is interested in audio content. This may involve moving through different power states based on different triggers at the device. For example, audio analysis may be performed selectively, for example, based upon detecting a body movement, e.g., a head bobbing, foot tapping, leap of joy, first pump, facial reaction, or other movement indicative of user interest. Similarly, determining that music is playing may be performed selectively, for example, based upon the audio analysis. Comparing audio elements with aspects of body movement may be performed selectively, for example, based on determining that a body movement and music are occurring simultaneously in the physical environment. Identifying source attributes of the audio, e.g., song name, artist, content provider, etc., may be based on successfully identifying a time-based relationship. Selectively performing analysis only in appropriate circumstances can contribute significantly to the efficient use of the processing, storage, power, and/or communication resources of the electronic device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be made by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
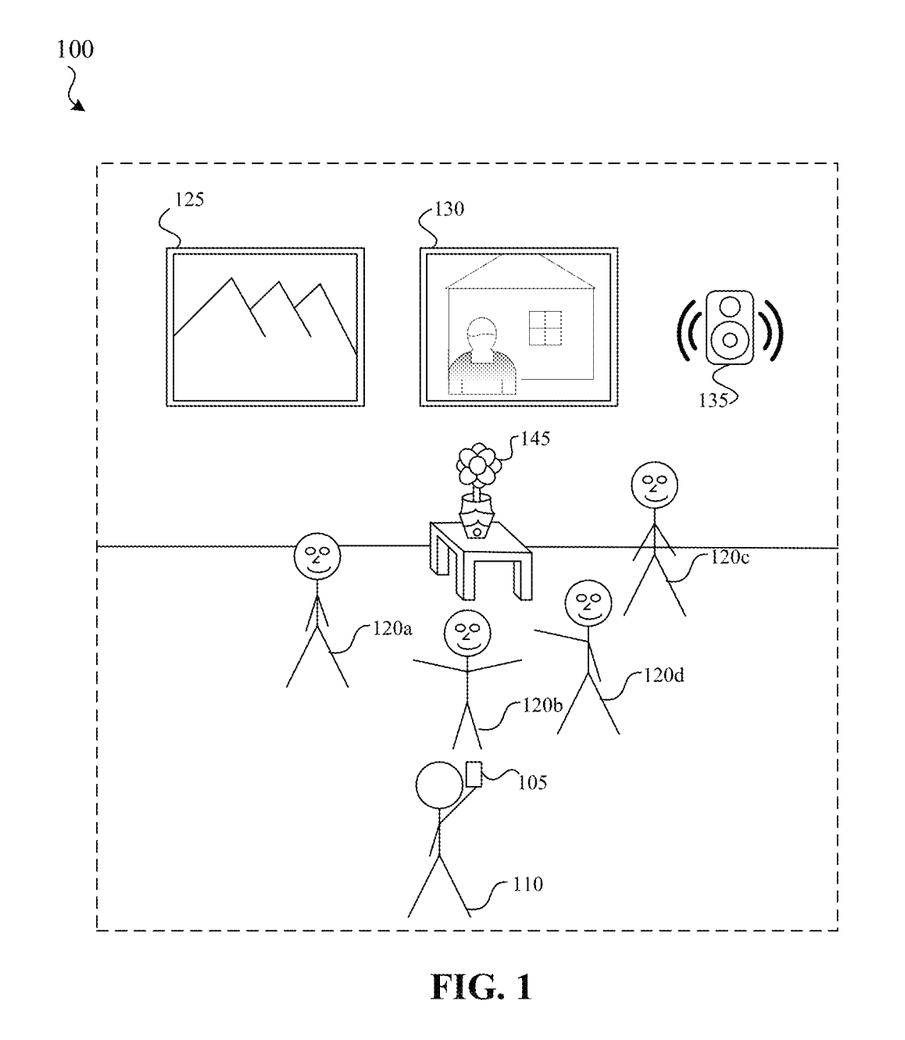
FIG. 1 illustrates an exemplary electronic device operating in a physical environment in accordance with some implementations.

FIG. 1 illustrates an exemplary electronic device 105 operated by user 110 in a physical environment 100. In this example, the physical environment 100 is a room that includes people 120a-d, wall hangings 125, 130, a wall speaker 135, and a vase 145 with flowers on a table. The electronic device 105 includes one or more cameras, microphones, depth sensors, or other sensors that can be used to evaluate the physical environment 100 and the people and objects within it. In the example of FIG. 1, the wall speaker 135 is playing audio that includes a song within the physical environment 100. In some implementations, a camera on device 105 captures one or more images of the physical environment and detects a body movement (e.g., a movement by user 110 and/or users 120a-d). In some implementations, a microphone on the device 105 captures audio in the physical environment, including the song that is playing via the wall speaker 135.

Figure 2:
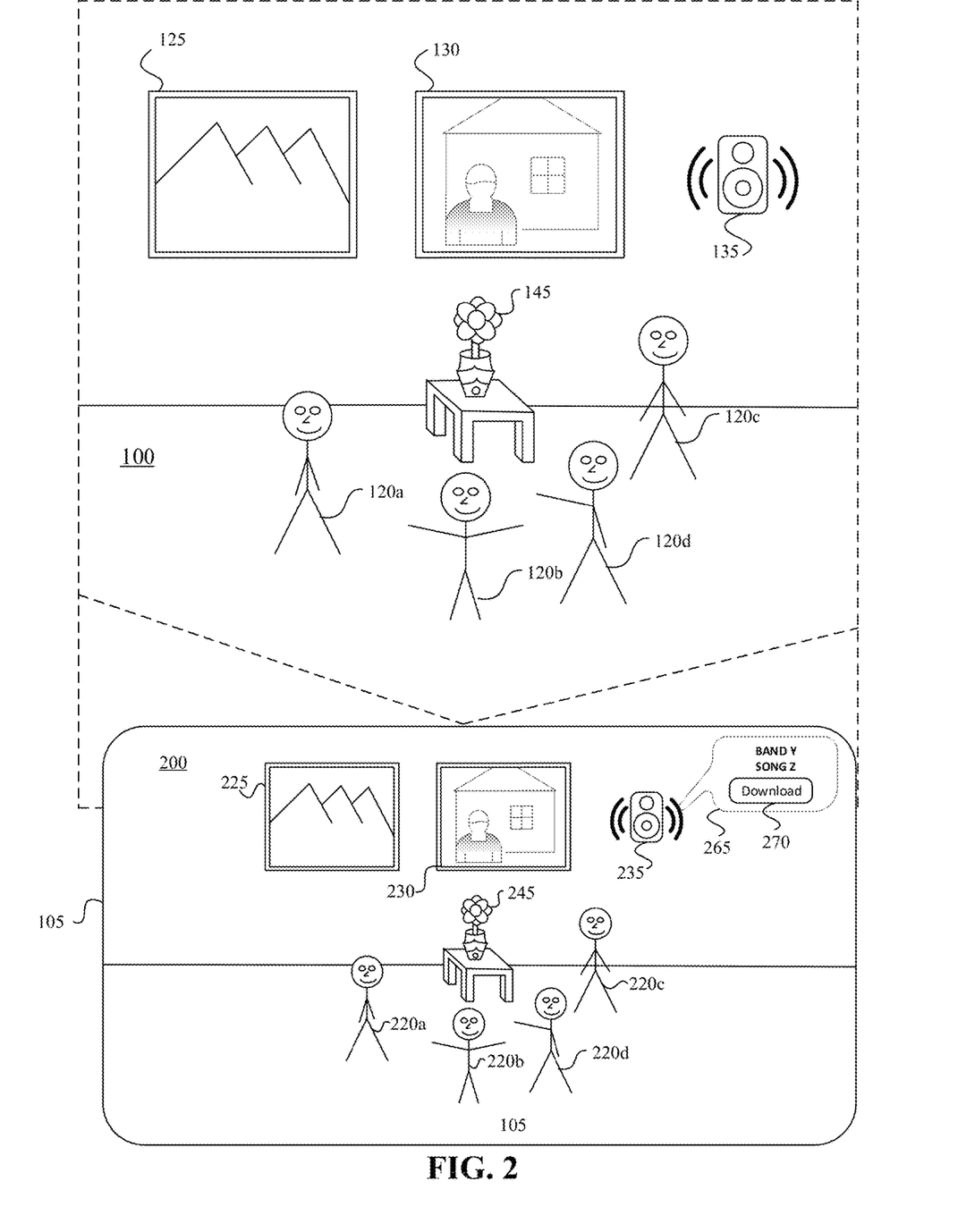
FIG. 2 illustrates the exemplary electronic device of FIG. 1 providing a view of the physical environment of FIG. 1 augmented with additional content based on detected body movement and audio in accordance with some implementations.

FIG. 2 illustrates the exemplary electronic device 105 of FIG. 1 providing a view 200 of the physical environment 100 of FIG. 1 augmented with additional content 265 based on detected body movement and audio. The view 200 includes depictions 220a-d of the people 120a-d, depictions 225, 230 of the wall hangings 125, 130, a depiction 245 of the flower 145, and a depiction 235 of the wall speaker 135. The electronic device 105 provides view 200 that includes depictions of the physical environment 100 from a viewer position, which in this example is determined based on the position of the electronic device 105 in the physical environment 100. Thus, as the user moves the electronic device 105 relative to the physical environment 100, the viewer position corresponding the electronic device 105 position is moved relative to the physical environment.

In this example, the view 200 includes augmented content 265 that includes an information bubble with information and features selected based on detecting a body movement and the audio within the physical environment 100. This may be based on the electronic device 105 obtaining first sensor data (e.g., via a microphone) corresponding to audio in the physical environment and obtaining second sensor data (e.g., via an image sensor and/or motion sensor) corresponding to a body movement in the physical environment 100. The electronic device may identify a time-based relationship between one or more elements of the audio (e.g., periodically repeating elements in the audio signal that correspond to the beat/rhythm/tempo of the song) and one or more aspects of the body movement (e.g., periodically repeating positions of a portion of the body) based on the first sensor data and the second sensor data. For example, this may involve determining that a user of the device is bobbing his head to the beat of the music that is playing aloud in the physical environment.

Figure 3:
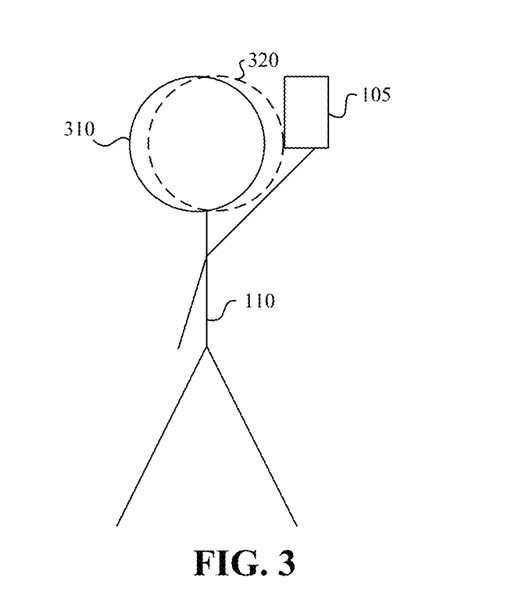
FIG. 3 illustrates the exemplary electronic device of FIG. 1 obtaining movement data according to implementations disclosed herein.

FIG. 3 illustrates the exemplary electronic device 105 of FIG. 1 obtaining movement data (e.g., images/motion sensor data) corresponding to the user 110 bobbing his head by moving it back and forth between position 310 and position 320. Such head bobbing may be recognized as a passive indication of interest in the music. In other examples, foot tapping in time with music, walking in time with music, dancing, jumping, first pumping, facial reaction, and/or other movements are identified as indication of interest in the audio. In some examples, user motion is recognized as an indication of interest based on its type (e.g., corresponding to excited behavior) and/or the movement following shortly after the time at which a significant event occurs in the audio, e.g., leaping for joy after a touchdown. The electronic device 105 identifies an interest in content of the audio based on identifying the time-based relationship.

The electronic device may perform one or more actions responsive to identifying interest in the content of the audio. In the example of FIG. 2, the electronic device 105 analyzes the content to determine the name of the song (e.g., "Song Z") and the artist who sings the song (e.g., "Band Y") and displays this information within the augmented content 265. The augmented content 265 also includes a selectable option 270, which, if selected, enables the user 105 to download the song to electronic device 105. Additional and/or different information and/or selectable options may be presented depending upon configuration parameters and/or user preferences.

In the example of FIG. 2, the augmented content 265 is positioned in the view 200 adjacent to the depiction 235 of the speaker 135. This positioning may be based on detecting the spatial positions of one or more audio sources within the physical environment 100 and associating the content of the audio with one or more of those sound sources. Providing augmented content 265 adjacent to the sound source of the audio content to which it relates may provide and intuitive and desirable user experience.

In the example of FIGS. 1-3, the electronic device 105 is illustrated as a single, hand-held device. The electronic device 105 may be a mobile phone, a tablet, a laptop, so forth. In some implementations, electronic device 105 is worn by a user. For example, electronic device 105 may be a watch, a head-mounted device (HMD), head-worn device (glasses), headphones, an ear mounted device, and so forth. In some implementations, functions of the device 105 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 105 may communicate with one another via wired or wireless communications.

According to some implementations, the electronic device 105 generates and presents an extended reality (XR) environment to one or more users. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 4:
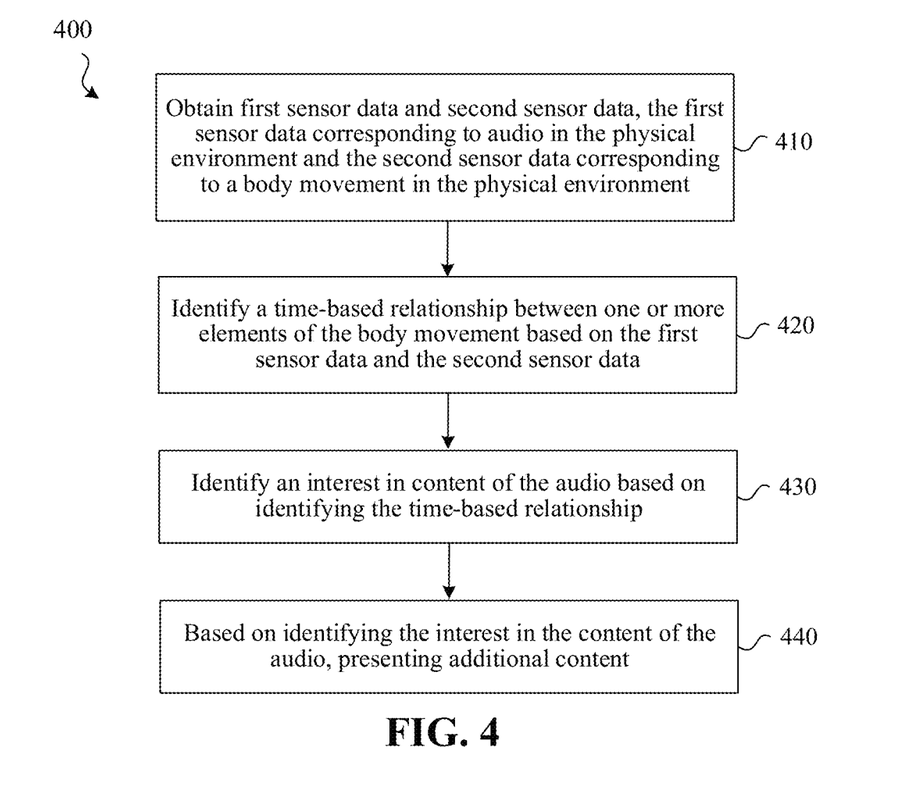
FIG. 4 is a flowchart illustrating a method for identifying interest in audio content by determining that a movement has a time-based relationship with detected audio content in accordance with some implementations.

FIG. 4 is a flowchart illustrating a method 400 for identifying interest in audio content by determining that a movement has a time-based relationship with detected audio content in accordance with some implementations. In some implementations, a device such as electronic device 105 performs method 400. In some implementations, method 400 is performed on a mobile device, desktop, laptop, HMD, ear-mounted device or server device. The method 400 is performed by processing logic, including hardware, firmware, software, or a combination thereof. In some implementations, the method 400 is performed on a processor executing code stored in a non-transitory computer-readable medium (e.g., a memory).

At block 410, the method 400 obtains first sensor data and second sensor data, the first sensor data corresponding to audio in the physical environment and the second sensor data corresponding to a body movement in the physical environment. Examples of audio in the physical environment include, but are not limited to, songs, instrumental music, poetry, live and recorded radio broadcasts and podcasts, and/or live and recorded television programming sound. The audio may be obtained using a microphone or microphone array.

The second sensor data corresponding to a body movement may correspond to a movement of the user of the device and/or to one or more other persons. Body movement data may be obtained using an image sensor such as a frame-based camera and/or using a motion sensor such as an accelerometer or gyroscope. In some implementations, a user wears one or more electronic device (e.g., head-mounted devices, watches, bracelets, anklets, rings, jewelry, clothing, etc.) that include motion and/or position sensors that track the movement of one or more parts of the user's body over time.

At block 420, the method 400 identifies a time-based relationship between one or more elements of the audio and one or more aspects of the body movement based on the first sensor data and the second sensor data. Identifying the time-based relationship may involve determining that a timing of a repeating body motion of the body movement matches a timing of a beat or rhythm of the content. For example, this may involve determining that the user is tapping his foot and/or bobbing his head to the beat of the music. Such movement having timing that corresponds to the elements of the audio may be a passive indication of interest in the music. Identifying the time-based relationship may involve matching a beats per minute of a song with a motions per minute of a movement, e.g., within an error threshold. There may be metadata for a song (which may be obtained via a network connection) that specifies the positions of beats within the song.

In another example, identifying a time-based relationship involves determining that the user is moving his lips (with or without producing sound) in a way that corresponds to the words of the content of the audio, e.g., lip synching to the current lyrics of the music. In another example, identifying the time-based relationship involves determining that the body movement is a reaction to an event of identified significance in the content. This may involve, for example, determining that a user motion indicative of excitement follows shortly after the time at which a significant event occurs, e.g., a touchdown, occurs in the audio.

At block 430, the method 400 identifies an interest in content of the audio based on identifying the time-based relationship. For example, this may involve determining that a particular song is playing and that the user is interested in the song based on his or her movement matching the beat of the song. In another example, this may involve determining that the user is interested in a football game that is on television based on determining that the user's body movement corresponded to celebratory actions following an event in the football game (e.g., an identified touchdown, an increase in the crowd noise in the television audio content, etc.).

In some implementations, additional and/or alternative information is used to identify and/or confirm the interest in the content of the audio. In one example, identifying the interest in the content is further based on determining that a voice (e.g., the device user) in the physical environment is singing along with the content. In another example, identifying the interest in the content is further based on identifying a gaze direction. For example, this may involve determining that the user is looking at the speaker that is playing the content or determining that the user is looking in a particular direction that the system uses to indicate interest (e.g., up and left). In another example, identifying the interest in the content is further based on an identified facial expression, e.g., an expression of focus combined with beat-matched head movement. In another example, the user's voice is detected and used to identify and/or confirm that the user is interested in the content, e.g., based on detecting expressions of interest or spoken content that corresponds to the content of the audio.

At block 440, the method 400, based on identifying the interest in the content of the audio, performs an action, such as presenting additional content. This may involve presenting an identification of the content on the electronic device (e.g., displaying the name of the song, artist, etc.). This may involve presenting text corresponding to words in the content. For example, the current playing position with a song may be determined and live lyrics of the currently-playing song may be displayed, e.g., providing a karaoke mode. In some implementations, performing an action can include presenting one or more selectable options for replaying the content, continuing to experience the content after leaving the physical environment, purchasing the content, downloading the content, and/or adding the content to a playlist. In other implementations, performing an action can include replaying the content, continuing to experience the content after leaving the physical environment, purchasing the content, downloading the content, and/or adding the content to a playlist automatically without presenting a selectable option to the user. For example, based on identifying the interest in the content, a characteristic of the content (e.g., music type, tempo range, type(s) of instruments, emotional mood, category, etc.) may be identified and used to identify additional content based on the identified characteristic. For example, based on detecting interest in a certain rhythm, other songs or audio content having similar rhythm may be suggested or identified to the user.

The identified interest may be used to enhance the user experience. For example, a speaker on the electronic device may play the song at a louder volume for the user than in the physical environment. The identified interest may be used to add the song to a user's favorites, add metadata to a recommendation profile of the user, recommend a playlist or other audio content to the user, generate a new playlist for the user and otherwise provide user experiences that are better customized to the user's current interests.

The identified interest may be used to facilitate improved user experiences outside of the physical environment, e.g., after the user leaves the current physical environment. For example, the next time the user accesses his music library one or more suggestions may be provided for adding new content may be provided based on the identified interest. In some circumstances, it may be desirable to wait until a condition is satisfied before providing information and/or selectable options based on an identified interest in content of the audio. Thus, for example, method 400 may determine to limit providing features associated with the content based on determining a user state. The method 400 may wait to provide features when the user is focused, "in the zone", driving, or otherwise busy. The method 400 may wait until the next time the user opens his music to identify/recommend the song and thus avoid disturbing the user with a notification at an inopportune moment.

Device resources may be used efficiently in determining that a user is interested in audio content. This may involve moving through different power states based on different triggers at the device. For example, audio analysis may be performed selectively, for example, based upon detecting a body movement, e.g., a head bobbing, foot tapping, leap of joy, first pump, facial reaction, or other movement indicative of user interest. Similarly, determining that music is playing may be performed selectively, for example, based upon the audio analysis. Comparing audio elements with aspects of body movement may be performed selectively, for example, based on determining that a body movement and music are occurring simultaneously in the physical environment. Identifying source attributes of the audio, e.g., song name, artist, content provider, etc., may be based on successfully identifying a time-based relationship. Selectively performing analysis only in appropriate circumstances can contribute significantly to the efficient use of the processing, storage, power, and/or communication resources of the electronic device.

In some implementations, indications of interest from people are combined, for example, to provide information about the collective interests of a group, e.g., determining how much an audience likes the music that a DJ or band is playing. Accordingly, the method 400 may involve identifying that multiple persons are interested in the content of the audio based on identifying time-based relationships using audio and body movement sensor data from the multiple persons in the physical environment.

Figure 5:
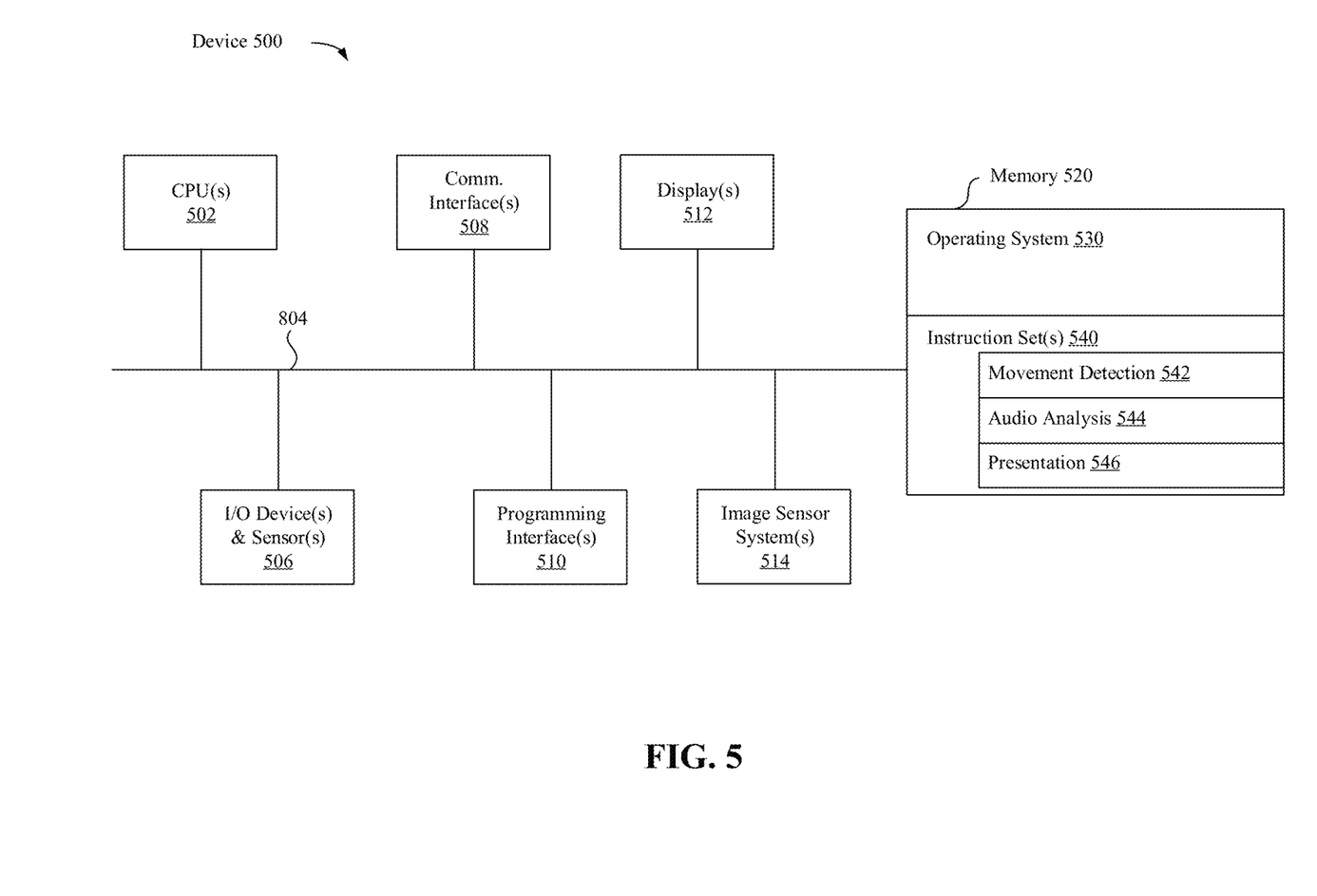
FIG. 5 is a block diagram of the electronic device of FIGS. 1-3 in accordance with some implementations.

FIG. 5 is a block diagram of electronic device 500. Device 500 illustrates an exemplary device configuration for electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 510, one or more output device(s) 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 512 include one or more displays configured to present a view of a 3D environment to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. wave-guide displays. In one example, the device 500 includes a single display. In another example, the device 500 includes a display for each eye of the user.

In some implementations, the one or more output device(s) 512 include one or more audio producing devices. In some implementations, the one or more output device(s) 512 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 512 may additionally or alternatively be configured to generate haptics.

In some implementations, the one or more image sensor systems 514 are configured to obtain image data that corresponds to at least a portion of the physical environment 100. For example, the one or more image sensor systems 514 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium.

In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 include a movement detection instruction set 542 configured to, upon execution, detect body movement as described herein, an audio analysis instruction set 544 configured to, upon execution, analyze audio as described herein, and a presentation instruction set 546 configured to, upon execution, present information and/or selectable options as described herein. The presentation instruction set 546 may be configured to provide content, e.g., views and/or sounds of an XR environment. In some implementations, the presentation instruction set 546 is executed to determine how to present content based on a viewer position. In some implementations, augmentations are overlain upon a 2D view, e.g., video passthrough or optical see-through, of a physical environment. In some implementations, augmentations are assigned 3D positions corresponding to positions adjacent to corresponding objects in the physical environment. The instruction set(s) 540 may be embodied as a single software executable or multiple software executables.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising,
at an electronic device having a processor:
   obtaining first sensor data and second sensor data corresponding to a physical environment, the first sensor data corresponding to audio in the physical environment and the second sensor data corresponding to a body movement in the physical environment;
   selectively switching to different power states on the electronic device based on multiple triggers identified at the electronic device, where selectively switching through the different power states comprises:
      detecting, based on the second sensor data, that the body movement corresponds to a type of body movement indicative of user interest in music;
      based on detecting that the body movement corresponds to the type of body movement indicative of user interest in music, selectively triggering performance of audio analysis to determine if music is playing based on the first sensor data;
      determining that music is playing based on the audio analysis;
      based on determining that music is playing, selectively triggering performance of a comparison of audio elements with one or more aspects of the body movement, based on the first sensor data and the second sensor data;
      identifying a time-based relationship between one or more elements of the audio and one or more aspects of the body movement via at least the comparison;
      based on identifying the time-based relationship, selectively triggering performance of a source attribute identification process; and
      identifying an interest in content of the audio based at least on the source attribute identification process;
      determining to wait to provide one or more features based on a user state corresponding to the user being busy; and
      providing one or more features based on identifying the interest in the content, wherein a timing of providing the one or more features comprises waiting based on the user state corresponding to the user being busy.

2. The method of claim 1 further comprising, based on identifying the interest in the content, presenting an identification of the content on the electronic device.

3. The method of claim 1 further comprising, based on identifying the interest in the content, presenting text corresponding to words in the content.

4. The method of claim 1 further comprising, based on identifying the interest in the content presenting a selectable option for:
   replaying the content;
   continuing to experience the content after leaving the physical environment;
   purchasing the content;
   downloading the content; or
   adding the content to a playlist.

5. The method of claim 1 further comprising, based on identifying the interest in the content, identifying a characteristic of the content and identifying additional content based on the identified characteristic.

6. The method of claim 1 further comprising determining to limit providing features associated with the content based on determining the user state.

7. The method of claim 1, wherein identifying the interest in the content is further based on determining that a voice in the physical environment is singing along with the content.

8. The method of claim 1, wherein identifying the interest in the content is further based on an identified gaze direction corresponding to a device that is producing the audio or a direction relative to a head of the user corresponding to mental state indicative of user interest.

9. The method of claim 1, wherein identifying the interest in the content is further based on an identified facial expression.

10. The method of claim 1, wherein identifying the time-based relationship further comprises determining that a timing of a repeating body motion of the body movement matches a timing of a beat or rhythm of the content.

11. The method of claim 1, wherein identifying the time-based relationship further comprises determining that lip movement of the body movement matches words of the content and identifying the interest in the content of the audio is based on identifying from the time-based relationship that the user is singing along or lip syncing to the words of the content.

12. The method of claim 1, wherein identifying the time-based relationship further comprises determining that the body movement is a reaction to an event in the content.

13. The method of claim 1, wherein the second sensor data corresponding to the body movement comprises:
   image sensor data in which a portion of a body moves over time; or
   motion sensor data from a motion sensor attached to a portion of the body.

14. The method of claim 1 further comprising identifying that multiple persons are interested in the content of the audio based on identifying time-based relationships using audio and body movement sensor data from the multiple persons in the physical environment.

15. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
  obtaining first sensor data and second sensor data corresponding to a physical environment, the first sensor data corresponding to audio in the physical environment and the second sensor data corresponding to a body movement in the physical environment;
  selectively switching to different power states on an electronic device based on multiple triggers identified at the electronic device, where selectively switching through the different power states comprises:
    detecting, based on the second sensor data, that the body movement corresponds to a type of body movement indicative of user interest in music;
    based on detecting that the body movement corresponds to the type of body movement indicative of user interest in music, selectively triggering performance of audio analysis to determine if music is playing based on the first sensor data;
    determining that music is playing based on the audio analysis;
    based on determining that music is playing, selectively triggering performance of a comparison of audio elements with one or more aspects of the body movement, based on the first sensor data and the second sensor data;
    identifying a time-based relationship between one or more elements of the audio and one or more aspects of the body movement via at least the comparison;
    based on identifying the time-based relationship, selectively triggering performance of a source attribute identification process; and
    identifying an interest in content of the audio based at least on the source attribute identification process;
  determining to wait to provide one or more features based on a user state corresponding to the user being busy; and
  providing one or more features based on identifying the interest in the content, wherein a timing of providing the one or more features comprises waiting based on the user state corresponding to the user being busy.

16. The system of claim 15, wherein the operations further comprise, based on identifying the interest in the content:
  presenting an identification of the content on an electronic device;
  presenting text corresponding to words in the content;
  replaying the content;
  continuing to experience the content after leaving the physical environment;
  purchasing the content;
  downloading the content; or
  adding the content to a playlist.

17. The system of claim 15, wherein identifying the interest in the content is further based on an identified gaze direction detected using images obtained via an image sensor.

18. A non-transitory computer-readable storage medium storing program instructions executable via one or more processors to perform operations comprising:
  obtaining first sensor data and second sensor data corresponding to a physical environment, the first sensor data corresponding to audio in the physical environment and the second sensor data corresponding to a body movement in the physical environment;
  selectively switching to different power states on an electronic device based on multiple triggers identified at the electronic device, where selectively switching through the different power states comprises:
    detecting, based on the second sensor data, that the body movement corresponds to a type of body movement indicative of user interest in music;
    based on detecting that the body movement corresponds to the type of body movement indicative of user interest in music, selectively triggering performance of audio analysis to determine if music is playing based on the first sensor data;
    determining that music is playing based on the audio analysis;
    based on determining that music is playing, selectively triggering performance of a comparison of audio elements with one or more aspects of the body movement, based on the first sensor data and the second sensor data;
    identifying a time-based relationship between one or more elements of the audio and one or more aspects of the body movement via at least the comparison;
    based on identifying the time-based relationship, selectively triggering performance of a source attribute identification process; and
    identifying an interest in content of the audio based at least on the source attribute identification process;
  determining to wait to provide one or more features based on a user state corresponding to the user being busy; and
  providing one or more features based on identifying the interest in the content, wherein a timing of providing the one or more features comprises waiting based on the user state corresponding to the user being busy.

* * * * *